United States Patent
Lee (10) Patent No.: US 8,720,390 B2
(45) Date of Patent: May 13, 2014

(54) FUEL PERFORMANCE BOOSTER

(75) Inventor: Sunggyu Lee, Athens, OH (US)

(73) Assignee: Northern Technologies International Corporation, Beachwood, OH (US)

( * ) Notice: Subject to any disclaimer, the term of this patent is extended or adjusted under 35 U.S.C. 154(b) by 0 days.

(21) Appl. No.: 13/613,273

(22) Filed: Sep. 13, 2012

(65) Prior Publication Data
US 2013/0071317 A1    Mar. 21, 2013

Related U.S. Application Data

(60) Provisional application No. 61/626,012, filed on Sep. 19, 2011, provisional application No. 61/550,507, filed on Oct. 24, 2011.

(51) Int. Cl.
*F02B 43/10*    (2006.01)
*C01B 3/32*    (2006.01)

(52) U.S. Cl.
USPC .................. 123/3; 123/1 A; 423/648.1

(58) Field of Classification Search
USPC ................. 123/1 A, 2, 3; 423/648.1
See application file for complete search history.

(56) References Cited

U.S. PATENT DOCUMENTS

| 4,086,877 A * | 5/1978 | Henkel et al. ................ 123/1 A |
| 4,429,534 A * | 2/1984 | Joy .................................... 123/3 |
| 4,913,842 A * | 4/1990 | Yoneoka et al. ............... 252/373 |
| 7,824,654 B2 * | 11/2010 | Wilson ........................ 423/648.1 |
| 2002/0182460 A1 * | 12/2002 | Okamoto ........................ 429/23 |
| 2006/0182680 A1 | 8/2006 | Keefer et al. |
| 2009/0092541 A1 * | 4/2009 | Takamura et al. ............ 423/657 |
| 2012/0020873 A1 * | 1/2012 | Cai ............................. 423/648.1 |

FOREIGN PATENT DOCUMENTS

IN    1389/CHE/2010 A    4/2011

OTHER PUBLICATIONS

Boukis, N et al., Methanol Reforming in Supercritical Water. Ind. Eng. Chem. Res. Jan. 24, 2003. vol. 42, pp. 728-735; p. 728, abstract; p. 728, left column, paragraphs 1-3; p. 729, figure 1; p. 729, left column, paragraphs 1, 3, 4; p. 732, left column, paragraph 1; p. 732, right column, last paragraph; p. 732, fig. 10; p. 733, right column, paragraphs 1, 4.

International Search Report and Written Opinion of the International Searching Authority; International Application No. PCT/US12/55303; International filing date Sep. 14, 2012; Applicant: Northern Technologies International Corporation.

* cited by examiner

*Primary Examiner* — Noah Kamen
(74) *Attorney, Agent, or Firm* — Hudak, Shunk & Farine Co. LPA (57) ABSTRACT

Hydrogen is produced from methanol and water under supercritical temperature and pressure conditions desirably without any catalyst. The hydrogen can be produced in situ on an internal combustion engine using a heat source such as the exhaust system of the internal combustion engine to achieve the supercritical temperature.

19 Claims, 2 Drawing Sheets

FUEL PERFORMANCE BOOSTER

CROSS REFERENCE

This application claims the priority filing date of U.S. Provisional Application Ser. No. 61/626,012 filed Sep. 19, 2011, entitled FUEL PERFORMANCE BOOSTER, and U.S. Provisional Application Ser. No. 61/550,507 filed Oct. 24, 2011, entitled FUEL PERFORMANCE BOOSTER, both applications herein fully incorporated by reference.

FIELD OF THE INVENTION

The present invention relates to the catalyst free production of hydrogen from only water and methanol. More specifically, hydrogen is produced in situ on an internal combustion engine of a vehicle or a stationary engine as by utilizing the exhaust of the engine to heat the solution and a pressure pump to achieve supercritical conditions in a reactor.

BACKGROUND OF THE INVENTION

Hydrogen has many uses including the production of ammonia, ethanol, and aniline; hydrocracking, hydroforming, and hydrofining of petroleum; hydrogenation of vegetable oils; hydrogenolysis of coal; reducing agent for organic synthesis and metallic ores; reducing atmosphere to prevent oxidation; as oxyhydrogen flame for high temperatures; atomic-hydrogen welding; instrument-carrying balloons; producing hydrogen chloride and hydrogen bromide; production of high-purity metals; fuel for nuclear rocket engines for hypersonic transport; and cryogenic research.

Hydrogen can also be utilized as a fuel, for example, rockets. It can further be utilized in fuel cells to generate electricity that can drive automobiles. Another use is as a direct transportation fuel for modified internal combustion engines.

Hydrogen currently is derived from many sources including (1) reaction of steam with natural gas (steam reforming) and subsequent purification; (2) partial oxidation of hydrocarbons to carbon monoxide and interaction of carbon monoxide and steam; (3) gasification of coal; (4) dissociation of ammonia; (5) thermal or catalytic decomposition of hydrocarbon gases; (6) catalytic reforming of naphtha; (7) reaction of iron and steam; (8) catalytic reaction of methanol and steam; and (9) electrolysis of water. Many of these processes require the use of a catalyst and require separate production plants to produce hydrogen.

SUMMARY OF THE INVENTION

Hydrogen is produced under supercritical conditions without any catalyst by reacting methanol with water generally according to the equation $$CH_3OH + H_2O = 3H_2 + CO_2$$

on a stoichiometric basis.

Other hydrogen feedstocks such as gasoline, ethanol, diesel fuel, vegetable oils, etc. are avoided since they do not provide suitable yields of desired product gases and typically involve additional reactive processes such as pyrolysis, reformation, dehydrogenation, hydrogenation, or recombination.

The noncatalytic production of hydrogen processes can be conducted on an internal combustion engine having a heat source, such as an exhaust system having a manifold, a catalytic converter, and a muffler, that can be utilized to heat methanol and water to a supercritical temperature.

An aspect of the invention relates to producing hydrogen by a process comprising the step of reacting methanol with water, wherein the weight ratio of said water to said methanol is from about 5 to about 30, at a pressure of at least about 3,100 psig, at a temperature of at least about 374° C., wherein said process is substantially free of fuels other than methanol, and producing hydrogen and carbon dioxide.

Another aspect relates to a process comprising producing hydrogen in association with an internal combustion engine approximately according to the formula:

$$CH_3OH + H_2O \xrightarrow[\text{Temperature}]{\text{Pressure}} 3H_2 + CO_2$$

substantially free of any catalyst at a pressure of at least about 3,100 psig and at a temperature of at least about 374° C., wherein the weight ratio of said water to said methanol is from about 5 to about 30, and wherein said process contains less than about 5 grams of a fuel other than said methanol and said water per liter of said methanol and said water.

Still another aspect relates to an internal combustion engine comprising a heat source; a methanol source and a water source, wherein the weight ratio of said water to said methanol is from about 5 to about 30; at least one pressure pump operatively connected to said methanol source and said water source and capable of pressurizing said methanol and water to a pressure of at least about 3,100 psig; a reactor, said reactor operatively connected to said pressurized water and methanol and operatively connected to said heat source, said heat source operatively adapted to heat said pressurized methanol and water to a temperature of at least about 374° C. and to react said methanol and said water to produce hydrogen and carbon dioxide.

DETAILED DESCRIPTION OF THE INVENTION

Hydrogen gas, that can be utilized as a fuel performance booster for internal combustion engines, is produced by a methanol hydrolysis reaction under supercritical conditions. The reaction is desirably free of a catalyst, is essentially stoichiometric and can utilize an external heat source such as a heater or small furnace that can be heated by any conventional fuel such as gasoline, or an electrical heating element attached to a battery, alternator, or generator; or preferably an internal heat source such as the exhaust heat of the internal combustion engine to heat the reactants to a supercritical temperature.

The internal combustion engine can be located in a vehicle or on a generally stationary surface, such as located on the ground, a floor such as concrete floor, and the like. With respect to a vehicle, generally any type of vehicle can be utilized regardless of the purpose thereof. Vehicles are generally classified with respect to either a passenger type or a load-carrying type, or both. Vehicles can have 2, 3, or 4 wheels or more. Thus, the internal combustion engine can be located on passenger-type vehicles having two wheels such as a moped, a scooter, or a motorcycle, and the like, or on a three-wheel vehicle, or passenger-type vehicles containing four wheels such as all types of automobile passenger vehicles including sports cars, sport utility vehicles, and the like. Load-carrying vehicles that generally have 3, 4 or more wheels include pick-up trucks as well as any other types of trucks such as semi-trailer trucks, or industrial lift trucks, buses, automotive flatbeds, and the like. Still other vehicles include internal combustion engines of an industrial nature such as lawn mowers, rototillers, backhoes, tractors, bulldozers, power shovel vehicles, any type of construction vehicles, and the like. Still other vehicles include various trains, ships, boats, and the like.

Stationary internal combustion engines are generally utilized in a large number of industrial uses such as home use, factories, manufacturing plants, mining and crushing plants, machine shops, assembly plants, foundries, forging plants, processing plants, packing plants, and the like.

Fuels for the internal combustion engines include numerous compositions such as alcohols, for example ethanol, gasoline, diesel fuel, biofuels, vegetable oils, crude oils, fuel oils, liquefied petroleum gas, liquefied natural gas, compressed natural gas, kerosene, and the like.

The heat source can be any part of the internal combustion engine that has a hot surface, or an auxiliary part or component of the internal combustion engine sufficient to heat the methanol and water solution to the supercritical temperatures and pressures set forth hereinbelow. Thus, the reactor can be located on the hot interior or exterior surface of the engine component and/or its auxiliary part, or inside the high-temperature zone downstream of the engine. Preferably, the reactor is located near or on the exhaust system of the internal combustion engine and more preferably is located within or is circumscribed by the exhaust system.

The use of methanol has been found to result in the efficient production of hydrogen with high yields and low impurities. Methanol is readily available by several processes known to the art and to the literature such as from natural gas, coal and wood. Other less common sources include biomass, algae and corn.

In the present invention, hydrogen is produced by heating the feedstocks or reactant components, i.e., methanol and water to the supercritical conditions of water, i.e. to at least about 374° C. and higher. Suitable reaction temperatures include at least about 475° C., generally at least about 500° C., desirably at least about 550° C., and preferably 600° C. or higher. The exhaust temperature of an internal combustion of a vehicle such as a motorcycle is generally from about 500° C. to about 725° C. and often from about 575° C. to about 625° C. Thus, as long as the exhaust heat from the internal combustion engine is available at a temperature higher than the required reactor temperature, for example about 500° C. or higher, the reaction of water and methanol into hydrogen and carbon dioxide can be achieved solely by the efficient utilization of waste heat from the exhaust. The higher the exhaust temperature, the more efficient is the reaction (yield) as well as the hydrogen production rate. While pressures higher than 3,200 psig (22.063 megapascals) can be utilized, such as about 3,600 psig (24.821 megapascals), it has been found that the same is unnecessary since no practical advantages are obtained with respect to hydrogen conversion or production. While pressures of less than 3,200 psig such as about 3,100 psig, (21.374 megapascals) can be utilized, it has been found that if lower pressures such as about 3,000 psig (20.684 megapascals) or about 2,500 psig (17.237 megapascals) are utilized for prolonged periods of time, for example, from about 1 to about 5 hours, the conversion efficiency suffers and the process is no longer supercritical.

The yield of the methanol hydrolysis reactions are high such as at least about 60 mole %, desirably at least about 70 mole %, preferably at least about 75 mole % or at least about 80 mole % with a highly preferred yield of at least about 90 mole % of methanol that is converted to hydrogen and carbon dioxide.

The reaction generally occurs according to the following equation:

wherein the temperature and pressure are as noted above. Thus, by simply utilizing methanol and water, three moles of hydrogen are produced for every one mole of carbon dioxide and the fuel can be used for generally any desired fuel end use, either alone or preferably with a convertnional fuel such as gasoline) to boost the performance of an internal combustion engine and also to improve gas mileage. The reaction is essentially stoichiometric with any unreacted components being essentially methanol and water. The amounts of impurities are generally low, that is, a total of about 3 mole % or less of carbon monoxide, 0.1 mole % or less of methane, and essentially no other impurities. The unreacted methanol and water component can simply be recycled back to the reactor, thus resulting in a very fuel efficient production system.

The production of hydrogen by conventional processes such as the reaction of methanol with water utilizing metal catalysts is at noncritical reaction conditions. The present invention does not require the use of any catalyst in the process, which renders the same very practical for everyday application and is also cost effective. Since the process is substantially free of catalysts, there is no concern with regard to catalyst poisoning, or the expensive catalysts being lost in the gas stream of an internal combustion engine. Another advantage is that the hydrogen production efficiency is virtually constant for a long period of operational time. By the term "substantially free of catalyst", it is meant that if utilized such as in the reactor, such catalysts as Ni, Pt, Ir, Rh, Ru, or Cu are utilized in very small amounts, such as generally less than about 5 grams or less than about 2 grams, desirably less than about 1 gram, and preferably less than 0.5 gram per liter of methanol water mixture. Preferably, no catalyst is used, i.e. it is nonexistent.

While the hydrogen produced by the present invention can be used as a fuel performance booster in an internal combustion engine with common or commercially available fuels, such other fuels are not utilized as a source for the production of hydrogen for various reasons. For example, the conversion of gasoline into hydrogen involves certain chemical reactions such as pyrolysis, reformation, recombination, coking, and the like. The conversion route also involves the use of a metal catalyst, very high temperature operation conditions, poor conversion of gasoline into hydrogen, high yield of methane, carbon fouling of the system, and a product gas that requires cleaning and purification. The end result is generally a very costly, unreliable and impractical fuel booster.

With respect to ethanol, the conversion of ethanol into hydrogen involves technological challenges very similar to the conversion of gasoline, since the reaction pathways leading to hydrogen are similar.

Diesel, biodiesel, or biofuel as a hydrogen booster fuel source would encounter even more complex technological problems than gasoline and ethanol, in its conversion to hydrogen.

Vegetable oils are also conceivable; however, vegetable oils render additional technological problems of feedstock uniformity in addition to the problems involved with the reformative conversion of other hydrocarbon fuels. Thus, its on-board conversion to fuel-grade hydrogen entails complex chemical mechanisms and multiple technologically-involved steps.

Thus, feedstocks or fuel sources other than methanol are avoided. That is, the hydrogen fuel source or feedstock of the present invention is substantially free of fuel such as gasoline, ethanol, diesel or biofuels, and vegetable oils. Thus, if utilized, the process contains generally less than about 5.0 grams, less than about 2 grams, desirably less than about 1 gram, and preferably less than 0.5 gram, and most preferably nil (none), fuel other than methanol and water per liter of the methanol-water feedstream.

An important aspect of the present invention is to utilize an excess of water to methanol so that high yields of methanol conversion are obtained and so that the water can absorb energy from a heat source preferably heat from the exhaust system, to heat the methanol as well as to act as a thermodynamic heat sink. The mass or weight feed ratio of water to methanol is generally from about 5 to about 20 or about 30, desirably from about 5 to about 15, and preferably from about 7 to about 13. If high weight ratios of water to methanol are not utilized as noted, the yield of methanol conversion to hydrogen and carbon dioxide is reduced with other undesirable byproducts being produced such as methane, ethylene, and the like. For example, when a low ratio of water is utilized such as less than about 5, the yield of methanol conversion to hydrogen and carbon oxides is significantly reduced such as to about 40% or less. The initial mass or weight of water to methanol ratio added to the reactor is as set forth above, say about 10 to 1. However, since about 1 mole of water and about 1 mole of methanol is reacted and consumed by the stoichiometric reaction, the subsequent amount of water and methanol added to the reactor feedstream is about 1 mole of water and 1 mole of methanol to replenish the reacted amounts. The remaining added amount of a material to the reactor is recycled water, say about 9 moles of water, so that the overall weight ratio is thus about 10 to 1.

The hydrogen gas of the present invention can be utilized in generally any type of internal combustion engine such as two stroke or four stroke, including diesel and biodiesel engines, provided that a heat source, either external or internal such as an engine exhaust, is of a sufficient temperature and quantity to heat the methanol-water mixture to the supercritical temperature of the water, e.g. at least about 374° C. The methanol and water fuel booster system can also be utilized with respect to large internal combustion engines generally having a total cylinder volume of at least about 2 or at least about 3 liters as well as about 5 liters and larger. Such engines can be located in various vehicles noted above such as automobiles, trucks, tractors, construction equipment, and train engines, ship engines, and the like.

The utilization of the methanol hydrolysis reactors of the present invention readily serves as a fuel performance booster and also results in a vehicle obtaining improved gas mileage. The improvement in fuel efficiency is generally at least about 20%, desirably at least about 30% or at least about 40%, and preferably at least about 50%.

Advantages of the invention include the following:

Unlike the reformation or pyrolysis of hydrocarbons, the process chemistry is based on a single chemical reaction. The reaction mechanism is generally very simple, straightforward and not affected by side reactions.

Since there is only one principal reaction, the product gas composition is always maintained at or close to its stoichiometric ratio of $H_2:CO_2=3:1$.

The hydrogen molecules in the product come from both methanol and water. Therefore, the product gas contains more hydrogen than the total available hydrogen in methanol alone.

As the reaction is based on the single-route direct hydrolysis of methanol, it generates very minute amounts of CO, if any. The absence of CO in the product gas is advantageous from the standpoints of hydrogen productivity as well as automatic process control.

On the other hand, catalytic reformation reactions generate CO and $H_2$ as its primary products in addition to $CH_4$ and $C_2H_4$, and a number of side reactions are also present. Although CO can be reacted with $H_2O$ to product $CO_2$ and $H_2$ via water gas shift reaction, this reaction is slow at 600° C. and does not go to completion. As a result the catalytic reformation reaction product gas inevitably contains substantial amounts of CO, $CH_4$, and $C_2H_4$ and the resultant product gas compositions are widely varying depending upon the reaction conditions. With reformation, there is also a possibility of carbon fouling or coking, which seriously affects the catalytic activity and eventually makes the system stop producing hydrogen entirely.

When used in association with internal combustion engines, the system or process does not need a separate heating source, but rather can readily utilize the heat generated by the engine as contained in the exhaust stream thereof. The recovery and utilization of waste heat in the generation of booster fuel also contributes to the increase in overall fuel efficiency.

The invention will be better understood by reference to the following examples which serve to illustrate, but not to limit the scope of the present invention.

EXAMPLE 1

A 1.0 SLPM Hydrogen Fuel Booster System

Process simulation for a 1.0-SLPM (standard liter per minute—0° C. and 1 atmosphere) hydrogen fuel booster system has been conducted using a commercial process simulator software. The following input parameters and operating conditions have been imposed and/or applied:

1. The reactor temperature was chosen to be at 600° C.
2. The reactor pressure was set at 3200 psig.
3. The desired hydrogen booster gas production rate was 1.0 SLPM.
4. The once-through conversion of methanol was set at 80% of the total methanol entering the converter based on the experimental results.
5. The reactor product gas contained 75% hydrogen and 25% carbon dioxide.
6. The mass feed ratio of water and methanol at the pump was 10:1 water-to-methanol by mass.
7. The methanol flow rate at the pump was 0.595 grams of methanol per minute.
8. The water flow rate was 5.95 grams of water per minute.
9. A flow of 4 ft³ per minute of air at 72° F. (22.2° C.) was assumed to further cool the reactor effluent.

10. The exhaust gas temperature available for thermal energy extraction was assumed to be at 550° C. Depending on the location, a higher temperature may be achievable.
11. The amount of energy exchanged between the incoming reactants (total flow entering the reactor) and the exiting products (hot effluent coming out of the reactor) was assumed to be 250 watts.
12. The reactor effluent was throttled adiabatically to 1 atm.
13. The reactor effluent was flashed adiabatically.

Operating Conditions and Input Parameters

A $H_2$ production rate of 1.0 SLPM was chosen as a base case, which serves as a center-point for the fuel booster design of a 10 horsepower engine. The choice was made based on (1) the desired enhancement level in well-to-wheel fuel efficiency, (2) the anticipated physical dimensions of the fuel booster system that needs to be installed on a motorcycle, and (3) the reasonable capability of the current technology under safe operational conditions.

1. The temperature of reaction is based on the experimental optimization results. Even if the temperature is off ±50° C. from this base case (or, a set point), the product concentration of the system is unaffected. However, a lower temperature would decrease the hydrogen production rate substantially, thus reducing the effectiveness and benefit of the fuel booster system.
2. The reactor operating pressure was determined based on the experimental optimization and theoretical chemical mechanistic studies. If the reactor pressure was maintained (or designed) at a pressure higher than 3,200 psig, the reactor performance was unaffected. However, if the conversion pressure was kept below 3,100 psig for a prolonged period of operation, the conversion efficiency would suffer. Therefore, maintaining the converter pressure at P≥3,200 psig was technologically essential, while any higher pressure than 3,200 psig was unnecessary and exhibited no practical advantage over just 3,200 psig.
3. An $H_2$ production rate of 1.0 SLPM was chosen as a base case rate for the system. This volumetric flow rate was equivalent to 0.18 gram $H_2$/minute or 10.7 grams $H_2$/hour.
4. Under the conditions prescribed above, the once-through conversion of methanol in the reactor was expected to be around 80% for a reactor retention time of 1.5 minutes. This value has been verified through reactor experiments.
5. The product gas has a composition of 75% $H_2$ and 25% $CO_2$ by volume (or, by moles). The concentration of other chemical species has been found to be negligible from the standpoints of gaseous fuel. The product ratio of $H_2$:$CO_2$=3:1(by volume) was obtained over a wide range of reactor operating temperatures. This consistency in the product gas spectrum makes the current process technology even more viable and practically adoptable.
6. The mass feed ratio of water to methanol was chosen and set at 10:1 for the design. According to the experimental optimization study, the optimal conversion was obtained at a higher water-to-methanol ratio (e.g., 15 or 30) when the methanol conversion was taken as the only optimization objective. However, a higher ratio would represent a larger system dimension for the overall productivity of $H_2$ fuel; therefore a lower ratio of 10 was chosen as a design set point.
7. The methanol feed rate to the reactor was set for this simulation at 0.595 grams per minute, which is equivalent to 0.0186 mol/min. This methanol input would produce 0.0558 moles of hydrogen per minute at 100% conversion, which was equivalent to 1.25 SLPM. At an 80% once-through conversion, this would generate 1.0 SLPM. The actual process design (and operation) was based on the combined reactor feed that includes the fresh feed and the re-circulated flow of water which also contains unconverted methanol, i.e., the 20% not yet reacted.
8. The total water flow rate entering the reactor was 10 times that of methanol, even though the two enter as a mixture. This combined feed flow includes freshly fed methanol-water solution as well as re-circulated water flow that contains some methanol not stripped in the separator.
9. This air flow rate was an assumed value for simulation purpose.
10. Depending upon the exact placement of the converter system, a higher temperature than 550° C. may be achieved.

The reactor volume for a 1.0-SLPM system was set as 70 $cm^3$ for a reaction temperature of 600° C. and at 3200 psig. This reactor volume includes some dead volume due to the end effects of cooling in a laboratory experimental reactor that was inevitably cooler at both ends. The end effects in the temperature profile for a flanged laboratory reactor can be altogether eliminated in the practical design, where the entire reactor body is situated in a highly convective heat transfer region of motorcycle's exhaust. In such a case, the reactor volume required would be smaller by about 25-30%.

The following data is based on actual experimental reaction data wherein the water-methanol weight ratio was about 10 to 1, or about 15 to 1, or about 20 to 1, and assumed motorcycle implementation conditions (described earlier). The specific data in this table are calculation results, assuming that the reactor is implemented in the motorcycle and other ancillary systems are also situated in the motorcycle. These data give essential values for actual motorcycle fuel booster prototype design and are very good estimates of material and energy balance of the system.

TABLE 1

Material Balance of Process Streams, 1.0 SLPM $H_2$ Production using an initial 10 to 1 feed weight ratio of water to methanol and thereafter a replenished amount of 1 mole of water and 1 mole of methanol

|  | Pump In | Pump Out | Heated Feed | Reactor Feed | Reactor Effluent | Effluent Out | Cooled Effluent | Product |
|---|---|---|---|---|---|---|---|---|
| $H_2O$, mol/min | 3.30E−01 | 3.30E−01 | 3.30E−01 | 3.30E−01 | 3.15E−01 | 3.15E−01 | 3.15E−01 | 3.15E−01* |
| $CH_3OH$, mol/min | 1.86E−02 | 1.86E−02 | 1.86E−02 | 1.86E−02 | 3.71E−03 | 3.71E−03 | 3.71E−03 | 3.71E−03# |
| $CO_2$, mol/min | 0.00E+00 | 0.00E+00 | 0.00E+00 | 0.00E+00 | 1.49E−02 | 1.49E−02 | 1.49E−02 | 1.49E−02 |
| $H_2$, mol/min | 0.00E+00 | 0.00E+00 | 0.00E+00 | 0.00E+00 | 4.46E−02 | 4.46E−02 | 4.46E−02 | 4.46E−02 |

TABLE 1-continued

Material Balance of Process Streams, 1.0 SLPM $H_2$ Production using an initial 10 to 1 feed weight ratio
of water to methanol and thereafter a replenished amount of 1 mole of water and 1 mole of methanol

|  | Pump In | Pump Out | Heated Feed | Reactor Feed | Reactor Effluent | Effluent Out | Cooled Effluent | Product |
|---|---|---|---|---|---|---|---|---|
| Total Flow, mol/min | 3.49E−01 | 3.49E−01 | 3.49E−01 | 3.49E−01 | 3.79E−01 | 3.79E−01 | 3.79E−01 | 3.79E−01 |
| Total Flow, g/min | 6.54E+00 | 6.54E+00 | 6.54E+00 | 6.54E+00 | 6.54E+00 | 6.54E+00 | 6.54E+00 | 6.54E+00 |
| Total Flow, m³/min | 7.87E−06 | 7.93E−06 | 3.48E−05 | 8.16E−05 | 1.16E−04 | 2.09E−05 | 1.43E−05 | 1.74E−03 |
| Temperature, K | 293 | 309 | 643 | 773 | 873 | 496 | 323 | 316 |
| Pressure, Pa | 1.01E+05 | 2.22E+07 | 2.22E+07 | 2.22E+07 | 2.22E+07 | 2.22E+07 | 2.22E+07 | 1.01E+05 |

The heated feed was the reactants exiting the double pipe heat exchanger on the way to the converter (reactor), effluent out was the reactor effluent exiting the double pipe heat exchanger, cooled effluent was the effluent cooled by passing air, and product was the throttled reactor effluent.

EXAMPLE 2

1.3-SLPM Hydrogen Fuel Booster System

Process simulation for a 1.3-SLPM hydrogen fuel booster system has been conducted using a commercial process simulator software. The input parameters and imposed operating conditions were specified as follows:

1. The reactor temperature was chosen to be at 600° C.
2. The reactor pressure was set at 3,200 psig.
3. The desired hydrogen booster gas production rate was 1.3 SLPM.
4. Conversion of methanol is 80%, the basis of reaction was stoichiometric.
5. The reactor product gas contained approximately 75% hydrogen and 25% carbon dioxide.
6. The mass feed ratio at the pump was 10:1 water to methanol.
7. The methanol flow rate at the pump was 07735 grams of methanol per minute.
8. The water flow rate was 7.735 grams of water per minute.
9. A flow of 4 ft³ per minute of air at 72° F. (22.2° C.) was assumed to further cool the reactor effluent.
10. The exhaust gas temperature available for thermal energy extraction was assumed to be at 550° C. Depending on the location, a higher temperature may be achievable.
11. The amount of energy exchanged between the incoming reactants and the exiting products was assumed to be 325 W.
12. The reactor effluent was throttled adiabatically to 1 atm.
13. The reactor effluent was flashed adiabatically.

Operating Conditions and Input Parameters

The simulation of Example 2 was for a case for a 30% higher production rate of hydrogen. By keeping the temperature and pressure of the reactor at the same values, i.e., 600° C. and 3200° prig, the reactor volume needs to be increased by 30%. In this case, the reactor retention time for chemical reactants through the reactor system would be still the same as that for the 1.0-SLPM case.

Accordingly, the reactor volume required to produce 3 SLPM of hydrogen at 600° C. and 3200 psig is 210 ml. Applying a scale-down factor of 1.3/3.0, the required reactor volume for 1.3-SLPM of hydrogen production would be 91 ml. It should be noted that the actual needed volume would be smaller in a realistic situation where the reactor end effect of temperature cooling is absent.

TABLE 2

Material Balance of Process Streams, 1.3 SLPM $H_2$ Production using an initial 10 to 1 feed weight ratio
of water to methanol and thereafter a replenished amount of 1 mole of water and 1 mole of methanol

|  | Pump In | Pump Out | Heated Feed | Reactor Feed | Reactor Effluent | Effluent Out | Cooled Effluent | Product |
|---|---|---|---|---|---|---|---|---|
| $H_2O$ mol/min | 4.29E−01 | 4.29E−01 | 4.29E−01 | 4.29E−01 | 4.10E−01 | 4.10E−01 | 4.10E−01 | 4.10E−01 |
| $CH_3OH$ mol/min | 2.41E−02 | 2.41E−02 | 2.41E−02 | 2.41E−02 | 4.83E−03 | 4.83E−03 | 4.83E−03 | 4.83E−03 |
| $CO_2$ mol/min | 0.00E+00 | 0.00E+00 | 0.00E+00 | 0.00E+00 | 1.93E−02 | 1.93E−02 | 1.93E−02 | 1.93E−02 |
| $H_2$ mol/min | 0.00E+00 | 0.00E+00 | 0.00E+00 | 0.00E+00 | 5.79E−02 | 5.79E−02 | 5.79E−02 | 5.79E−02 |
| Total Flow mol/min | 4.53E−01 | 4.53E−01 | 4.53E−01 | 4.53E−01 | 4.92E−01 | 4.92E−01 | 4.92E−01 | 4.92E−01 |
| Total Flow g/min | 8.51E+00 | 8.51E+00 | 8.51E+00 | 8.51E+00 | 8.51E+00 | 8.51E+00 | 8.51E+00 | 8.51E+00 |
| Total Flow m³/min | 1.02E−05 | 1.03E−05 | 5.94E−05 | 1.06E−04 | 1.50E−04 | 2.49E−05 | 1.85E−05 | 2.26E−03 |
| Temperature K | 293 | 309 | 657 | 773 | 873 | 465 | 323 | 316 |
| Pressure Pa | 1.01E+05 | 2.22E+07 | 2.22E+07 | 2.22E+07 | 2.22E+07 | 2.22E+07 | 2.22E+07 | 1.01E+05 |

The heated feed was the reactants exiting the double pipe heat exchanger on the way to the reactor, effluent out was the reactor effluent exiting the double pipe heat exchanger, cooled effluent was the effluent cooled by passing air, and product was the throttled reactor effluent.

Figure 1:
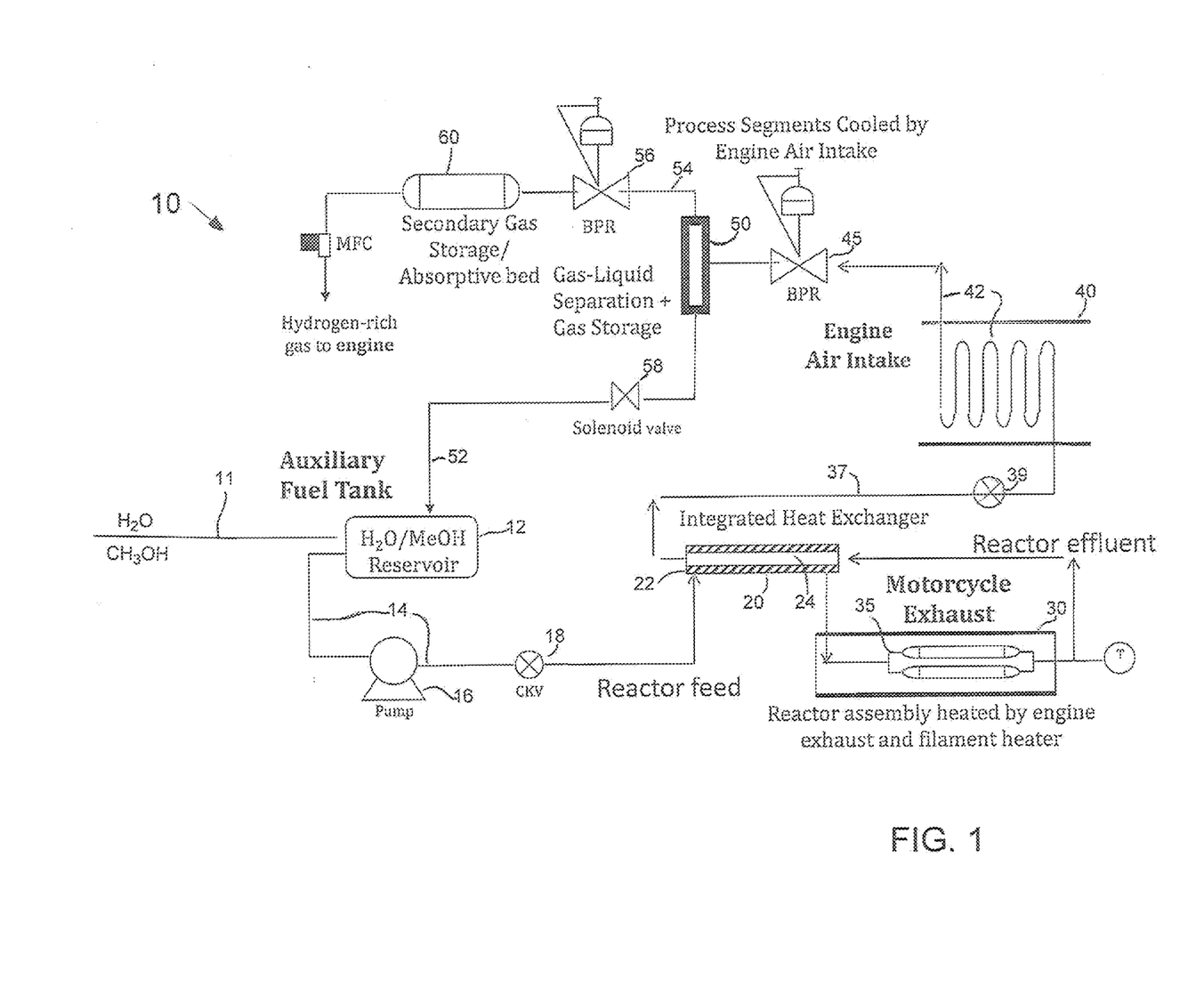
FIG. 1 is a schematic diagram of one embodiment of a process for producing hydrogen in situ on an internal combustion engine.

A schematic of the process flow is set forth in FIG. 1.

FIG. 1 relates to a schematic of the hydrogen fuel production process of the present invention and serves only as one embodiment of a process flow scheme, and not necessarily an actual apparatus.

Water and methanol in appropriate amounts are fed via input feedline 11 into the non-catalytic hydrogen production system 10 of the present invention. Tank or reservoir 12 serves to retain the water-methanol mixture until required. Tank 12 is mounted on the vehicle such as a motorcycle at a location convenient to the reactor 35. The water-methanol mixture is fed via line 14 to pressure pump 18, which as noted above, serves to increase the pressure of the fluid to at least about 3,100 or to at least about 3,200 psig. While only one pump is shown, two or more pumps can be utilized. Suitable pressure pumps that can be utilized to increase the pressure to the desired indicated levels are known to the literature and to the art. Such pressure pumps are generally of a reciprocating type such as a piston pump or a plunger pump. Upon being pressurized, the water-methanol fluid flows through check valve 18 and then into integrated heat exchanger 20. One or more heat exchangers can be utilized such as a simple double pipe (e.g. two concentric cylinders) that heats the water-methanol mixture in the outer annulus 22 by the hot reactor effluent that flows through inner pipe 24. The pressurized water-methanol fluid flows counter-current to the reactor effluent fluid whereby the water-methanol fluid is preheated. The water-methanol fluid then generally flows at a slow feed rate through the reactor feedline desirably implemented or housed inside exhaust system 30 wherein a reactor 35 is generally contained inside the exhaust system where in situ heat is available at a maximum temperature. Upon flowing through the very hot exhaust system, the water-methanol fluid is readily heated in the reactor to a temperature of at least 374° C. and preferably higher such as at least about 550° C. When such temperatures are obtained, supercritical conditions with respect to water and generally the water-methanol fluid are reached and hydrogen is produced along with carbon dioxide. The supercritical fluid then flows through heat exchanger 20 where, as noted above, it partially heats the incoming water-methanol fluid. The heated hydrogen-carbon dioxide reaction product then flows through line 37, through check valve 39, and into another heat exchanger 40 that is mounted on the vehicle. Heat exchanger 40 can be a separate heat exchanger or can be part of the air intake system that is fed to the cylinders of the engine. Heat exchanger 40 can be of any conventional design and shape and serves to cool the heated hydrogen-carbon dioxide fluid along with the excess water therein and is fed through flow line 42 into back pressure regulator 45. Regulator 45 serves to control and maintain the pressure of the gas-liquid separator at a desired (prescribed) pressure and then the hydrogen-carbon dioxide fluid is fed to gas-liquid separator tank 50 wherein, since the fluid is at a reduced temperature, the hydrogen and carbon dioxide gases are separated from the residual water and any unreacted methanol. The hydrogen-carbon dioxide gas flows through hydrogen gas line 54 where it is regulated by back pressure valve 56 and sent into a secondary hydrogen gas storage tank 60. The hydrogen gas is then subsequently supplied to the engine desirable in an amount of from about 0.3 to about 3.0 or to about 5.0 wt. %, desirably from about 0.3 to about 1.5 wt. %, and preferably from about 0.3 to about 0.9 wt. %, based upon the total weight of a conventional fuel fed to the internal combustion engine, such as gasoline or diesel fuel. In the final fuel mixture fed to the engine, the energy contribution by hydrogen is generally from about 0.9% to about 9.0% or about 15%, desirably from about 0.9% to about 4.5%, and preferably from about 0.9% to about 2.7%. However, unexpectedly, the fuel efficiency to generate power is enhanced by about 30 to about 50% over a conventional gasoline engine.

The separated liquid in tank 50 that is essentially water and a small amount of unconverted methanol flows through water recycle line 52 and solenoid valve 58 and is recycled into the water-methanol tank 12 or directly mixed into the feed flow stream 14. An important aspect of this flow diagram is that no water is discharged from the overall system. That is, the water is recycled with only a small replenishment amount thereof into water-methanol tank 12 because the reaction consumes water. The water thus serves at least two functions, as a reaction medium and at the same time as a companion reactant. Similarly, a small replenished amount of methanol is added to the reactor feedstream because the reaction consumes methanol.

Figure 2:
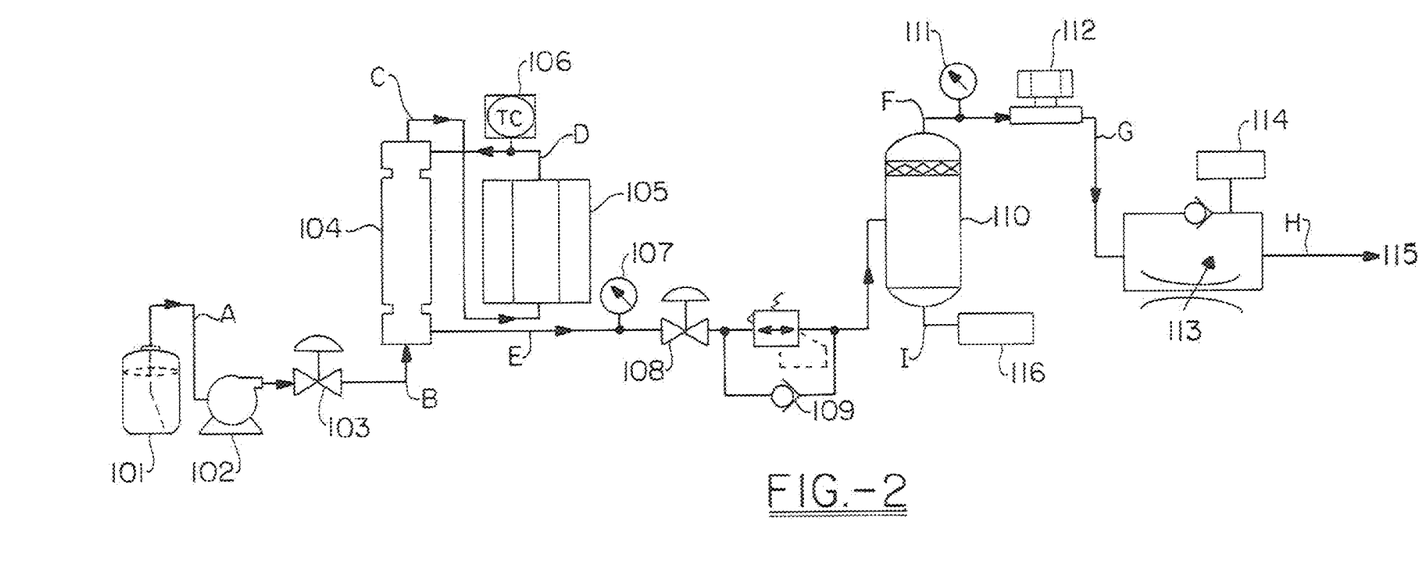
FIG. 2 is a schematic diagram of another embodiment of a process for producing hydrogen in situ on an internal combustion engine.

Another embodiment relates to an actual reaction system 100 as set forth in FIG. 2 that is similar to the reaction system of FIG. 1. The various reaction parameters, such as temperature, reaction pressure, yield, mass feed ratios, and the like are as set forth hereinabove and accordingly fully incorporated by reference.

The methanol and water contained in mixture tank 101 is fed via feed line A to a metering pump 102 that substantially increases the pressure of the mixture. Pump 102 via solenoid valve 103 and feed line B feeds the methanol-water mixture to heat exchanger 104 whereby the temperature of the feed mixture is increased with a resulting increase in pressure as well. The methanol-water feed mixture via feed line C is then fed to externally heated reactor 105, e.g. as by the exhaust system of a vehicle, so that the reactor temperature is at least about 374° C. with the pressure of the feed mixture being at least about 3,100 or about 3,200 psi. Temperature controller 106 ensures that reactor 105 is at a sufficient temperature so that supercritical conditions exist within the reactor. Under these conditions, the methanol and water is reacted to substantially yield gaseous products of hydrogen and carbon dioxide. The reacted and heated product is then fed via feed line D to heat exchanger 104 whereby it pre-heats the incoming methanol-water feedstock. The product mixture via feed line E is fed to flash separator 110 wherein, due to the reduced pressure caused by back pressure regulator 109 and solenoid valve 108, unreacted methanol and water 116 are separated and can be recycled back to the reactor, not shown. The resultant product hydrogen and carbon dioxide gas is taken out of the flash separator 110 and a small flow stream of it is split and fed, via line F, to septum 112. Septum 112 serves as a gas sampling port for gas chromatograph analysis. The hydrogen rich product gas via feed line G is admitted to mass flow controller 113. The hydrogen rich product gas can then be added to an internal combustion engine at desired sufficient rate using mass flow meter 114 and feed line 115.

EXAMPLE 3

Table 3 generally relates to the same analysis as set forth with respect to Examples 1 and 2, but wherein the water to methanol weight ratio is about 15 to 1.

TABLE 3

| Run No. | Temp (° C.) | Pressure (psig) | Water (g/min) | Feul | Fuel Flow (g/min) | Air Flow (slpm) | Product Gas Flow (slpm) | Gas Composition (mol % or vol %) | | | | | | | Total |
|---|---|---|---|---|---|---|---|---|---|---|---|---|---|---|---|
| | | | | | | | | $H_2$ | $N_2/O_2$ | CO | $CH_3$ | $CO_2$ | $C_2H_4$ | $C_2H_6$ | |
| MeOH_01 | 593 | 3499 | 15.6 | MeOH | 0.95 | 0.0 | 0.10 | 74.1 | 0.0 | 18.2 | 1.7 | 7.0 | 0.1 | 0.5 | 101.6 |
| MeOH_02 | 644 | 3499 | 15.0 | MeOH | 1.00 | 0.0 | 0.55 | 72.8 | 0.0 | 23.6 | 1.2 | 6.1 | 0.0 | 0.0 | 103.6 |
| MeOH_03 | 694 | 3501 | 14.7 | MeOH | 0.94 | 0.0 | 2.04 | 75.1 | 0.0 | 18.9 | 0.6 | 11.0 | 0.0 | 0.0 | 105.6 |
| MeOH_04 | 741 | 3488 | 14.3 | MeOH | 0.94 | 0.0 | 2.79 | 77.5 | 0.0 | 7.3 | 0.6 | 18.8 | 0.0 | 0.0 | 104.1 |

Temperature dependency investigated. The reactor retention time was kept at ~0.5 minutes.

75*% $H_2$

More gas production at higher T

As apparent from Table 3, good material balances (close to 100%, with little unaccountables), 75% $H_2$ regardless of Temp, water to fuel ratio being 15:1 (in weight), $CO+CO_2$ at about 25% pretty much always, $CO_2$ increasing with Temp (also, with reactor residence time, which is not shown in this specific data table).

As noted above and hereby fully incorporated by reference, the hydrogen producing reactors of the present invention can generally be utilized in conjunction with any size internal combustion engine wherein a heat source such as the exhaust thereof can heat the reactants to a suitable supercritical temperature of at least about 374° C. and a pressure pump as driven by the vehicle engine can produce a supercritical pressure of at least about 3,200 psig. The improvement with regard to fuel efficiency provided by the non-catalytic hydrogen production system of the present invention with respect to the gasoline mileage of the vehicle should be at least about 20%, desirably at least about 30% or at least about 40%, and preferably at least about a 50% improvement. The enhancement is primarily based upon the following four factors: (1) utilization of waste heat of exhaust to produce fuel hydrogen; (2) higher combustion efficiency of hydrogen and hydrogen containing gas; (3) efficient atomization of mixture fuel; and (4) cleaner burning.

While the invention can utilize on large internal combustion engines including gasoline, diesel and biofuel engines as for passenger automobiles, pick-up trucks, regular trucks, semi-trailer trucks, railroad train engines and ship engines, etc it is preferably utilized on smaller engines such as that for motorcycles, and the like.

In accordance with the patent statues, the best mode and preferred embodiments have been set forth, however the scope is not limited thereto, but rather by the scope of the attached claims.

What is claimed is:

1. A vehicle internal combustion engine comprising:
a heat source;
a tank containing a mixture of water and methanol, wherein the weight ratio of said water to said methanol is from 5 to 30;
at least one pressure pump operatively connected by a feed line to said water-methanol tank, said pressure pump capable of pressurizing said water-methanol mixture to a pressure of at least about 3,100 psig;
a catalyst free reactor, said reactor operatively connected to said pressurized water-methanol mixture and operatively connected to said heat source, said heat source adapted to heat said pressurized water-methanol mixture to a temperature of at least about 374° C. and to react said methanol and said water to produce a yield of at least about 70 mole percent of said methanol to hydrogen and carbon dioxide, and
a flow line operatively connected to said reactor and said vehicle internal combustion engine, said flow line capable of feeding said hydrogen to said internal combustion engine to power the same.

2. The vehicle engine of claim 1, wherein said reactor, and said water-methanol mixture are substantially free of fuels other than methanol.

3. The vehicle engine of claim 2, wherein said reactor temperature is adapted to be at least about 475° C., wherein the yield of said methanol converted to said hydrogen and said carbon dioxide is at least about 80 mole %, wherein said heat source is an exhaust system of said engine, and wherein said water-methanol mixture contains less than about 5 grams of a fuel other than said water and said methanol per liter of said water and said methanol.

4. The vehicle engine of claim 1, wherein said heat source is an exhaust system of said engine, wherein said reactor pressure is adapted to be at least about 3,200 psig, wherein said reaction temperature is at least about 475° C., and wherein said weight ratio of said water to said methanol is 7 to 20.

5. The vehicle engine of claim 4, wherein said reactor temperature is adapted to be at least about 500° C., wherein said weight ratio of said water to said methanol is 7 to 15, wherein said yield of methanol converted to said hydrogen and carbon dioxide is at least about 90 mole %, and wherein said water-methanol mixture contains less than about 5 grams of a fuel other than said water and said methanol per liter of said water and said methanol.

6. The vehicle engine of claim 4, wherein said vehicle engine is located on a moped, a scooter, a motorcycle, a three-wheeler, an automotive passenger vehicle, a pick-up truck, a semi-trailer truck, an industrial lift truck, a bus, a lawn mower, a rototiller, a backhoe, a tractor, a bulldozer, a power shovel vehicle, a construction vehicle, a train, a ship, or a boat.

7. The vehicle engine of claim 1, wherein said engine is a gasoline engine, a diesel engine, a hiofuel engine, a liquefied petroleum gas engine, or a compressed natural gas engine.

8. The vehicle engine of claim 4, wherein said engine is utilized as a stationary engine located in a factory, a manufacturing plant, a mining or crushing plant, a machine shop, an assembly plant, a foundry, a forging plant, a processing plant, or a packing plant.

9. A process for producing hydrogen, comprising the step of:
reacting methanol with water in a catalyst free reactor, wherein the weight ratio of said water to said methanol is from about 5 to about 30, at a pressure of at least about 3,100 psig, and at a temperature of at least about 374° C., wherein said process is substantially free of fuels other than methanol, and producing hydrogen and carbon dioxide wherein the yield of methanol converted to said hydrogen and carbon dioxide is at least about 70 mole %, and feeding said hydrogen to an internal combustion engine to power same.

10. The process of claim 9, wherein said pressure is at least about 3,200 psig, wherein said temperature is at least about 475° C., and wherein the yield of said methanol converted to said hydrogen and carbon dioxide is at least about 75 mole %.

11. The process of claim 10, wherein the weight ratio of said water to said methanol is from 7 to 20, and wherein said process contains less than about 5 grams of a fuel other than said methanol and said water per liter of said methanol and said water.

12. The process of claim 10, wherein said temperature is at least about 500° C.; and
wherein the yield of said methanol converted to said hydrogen carbon dioxide is at least 80%.

13. The process of claim 12, including a heat exchanger, said heat exchanger cooling said reaction product comprising said hydrogen and carbon dioxide.

14. The process of claim 13, wherein the weight ratio of said water to said methanol is from 7 to 13, wherein said temperature is at least about 550° C., wherein the yield of said methanol converted to said hydrogen and carbon dioxide is at least about 90 mole %, including a gas-liquid separator, and feeding said cooled liquid reaction product to said gas-liquid separator.

15. The process of claim 12, wherein said process contains less than about 2 grams of a fuel other than said methanol and said water per liter of said methanol and said water.

16. A process comprising:
producing hydrogen in association with a vehicle internal combustion engine approximately according to the formula:

$$CH_3OH + H_2O \xrightarrow[\text{Temperature}]{\text{Pressure}} 3H_2 + CO_2$$

in a catalyst free reactor at a pressure of at least about 3,100 psig and at a temperature of at least about 374° C., wherein the weight ratio of said water to said methanol is from 5 to 30, wherein the yield of methanol converted to said hydrogen and carbon dioxide is at least about 70 mole %, and feeding said hydrogen to an internal combustion engine to power the same.

17. The process of claim 16, wherein said weight ratio of said water to said methanol is from 7 to 20, wherein said temperature is provided by said vehicle internal combustion engine and is at least about 475° C.

18. The process of claim 17, wherein said weight ratio of said water to said methanol is from 7 to 15, and wherein the yield of methanol converted to said hydrogen and carbon dioxide is at least about 75 mole percent, and wherein said process contains less than about 5 grams of a fuel other than said methanol and said water per liter of said methanol and said water.

19. The process according to claim 18, wherein said pressure is at least about 3,200 psig, wherein said vehicle internal combustion engine has an exhaust system, wherein said temperature is derived from said exhaust system and is at least about 500° C., wherein the weight ratio of said water to said methanol is from 7 to 13, wherein said yield is at least about 90 mole percent, and wherein said process contains less than about 1 gram of a fuel other than said methanol and said water per liter of said methanol and said water.

* * * * *

UNITED STATES PATENT AND TRADEMARK OFFICE
CERTIFICATE OF CORRECTION

PATENT NO. : 8,720,390 B2  
APPLICATION NO. : 13/613273  
DATED : May 13, 2014  
INVENTOR(S) : Sunggyu Lee Page 1 of 1

It is certified that error appears in the above-identified patent and that said Letters Patent is hereby corrected as shown below:

In the Claims:

Column 14, claim 7, line 61, "hiofuel" should be replaced with --biofuel--

Column 15, claim 9, line 5, "5 to about 30" should be replaced with --5 to 30--

Signed and Sealed this  
Nineteenth Day of August, 2014

Michelle K. Lee  
*Deputy Director of the United States Patent and Trademark Office*